No. 754,468. PATENTED MAR. 15, 1904.
N. LOMBARD.
SAFETY VALVE.
APPLICATION FILED JULY 11, 1903.
NO MODEL.
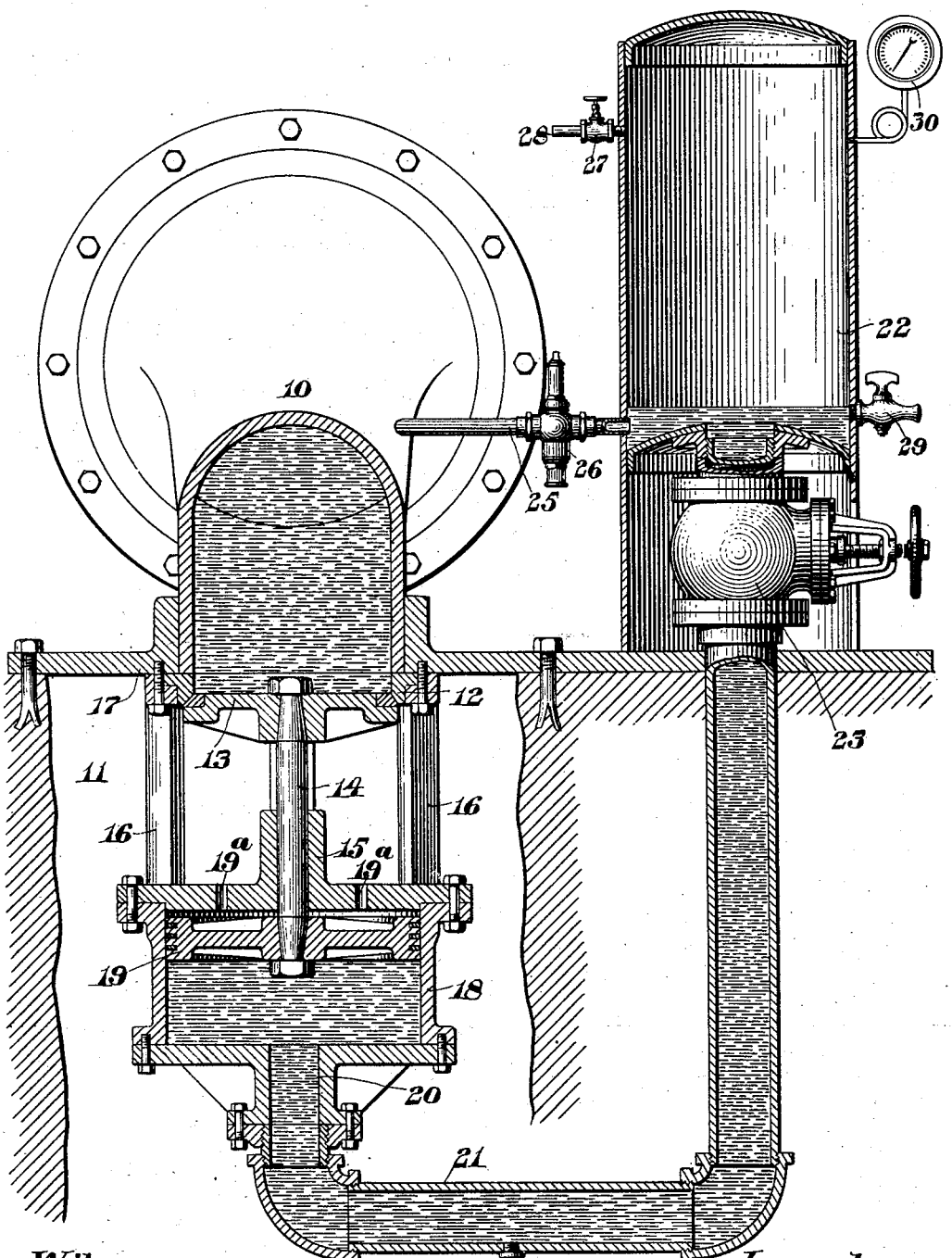
Witnesses:
Nathan C. Lombard 2nd
GH Dailey
Inventor:
Nathaniel Lombard,
by Walter E. Lombard,
Atty.

No. 754,468. Patented March 15, 1904.

UNITED STATES PATENT OFFICE.

NATHANIEL LOMBARD, OF WORCESTER, MASSACHUSETTS, ASSIGNOR TO THE N. LOMBARD IMPROVED GOVERNOR COMPANY, OF WATERVILLE, MAINE, A CORPORATION OF MAINE.

SAFETY-VALVE.

SPECIFICATION forming part of Letters Patent No. 754,468, dated March 15, 1904.

Application filed July 11, 1903. Serial No. 165,087. (No model.)

*To all whom it may concern:*

Be it known that I, NATHANIEL LOMBARD, a citizen of the United States of America, and a resident of Worcester, in the county of Worcester and State of Massachusetts, have invented certain new and useful Improvements in Relief-Valves, of which the following is a specification.

My invention relates to devices for relieving a fluid system of undue pressure, being particularly adapted for use in hydraulic systems to prevent the shocks or water-hammer arising from the closure of the valves controlling the flow to turbines or the like in governing their speed or when shutting down. It has for its object the various features hereinafter described and claimed.

The accompanying drawing is a vertical section of a relief-valve system embodying this invention.

A conduit 10, such as a feed-pipe of a turbine or like power system, delivers into a passage 11, which may lead to the tail-race. Formed upon or secured to the end of this conduit is a seat 12 for the disk 13 of the relief-valve, which is arranged to open under abnormal pressure on the system. For this purpose the disk is mounted upon a spindle 14, sliding in a bearing-plate 15, supported by rods 16, depending from a plate 17, which may close the top of the passage 11 and support the end of the conduit. Upon the under side of the bearing-plate is mounted a chamber or cylinder 18, in which operates a piston 19 of greater area than the portion of the valve-plate in normal contact with the fluid in the conduit and fast upon the spindle.

Openings 19ª through the bearing-plate may be provided to permit the escape of any fluid which may leak by the edge of the piston. With an opening 20, preferably in the lower wall of the cylinder, communicates a pipe 21, which may pass upward through the plate 17 to a cylinder 22, closed at its upper end. In the pipe 21 is a gate 23, normally open, but which may be closed when it is desired to withdraw the fluid from the pipe 21 and chamber 18 through the petcock 24.

A pipe 25, leading from the conduit 10, communicates with the lower end of the cylinder 22, said pipe being provided with a reducing-valve 26, by which the amount of fluid passing from the conduit 10 to the cylinder 22 may be regulated. The reducing-valve 26 is of usual construction and permits of any pressure being maintained within the cylinder 22 notwithstanding the amount of pressure which is contained within the conduit 10. The pipe 25 is for the purpose of supplying fluid to the cylinder 22 to make up any deficiency therein caused by a leakage of the fluid around the piston 19.

The cylinder 22 is closed at the top and is filled with air under pressure, thereby forming an air-chamber, said air being retained by the valve 27 in the pipe 28, through which the air is forced into the cylinder by means of any suitable pumping device. (Not shown.) The cylinder 22 is supplied with a cock 29 at the level that it is desired to maintain the fluid therein, the object of this device being to indicate when the desired amount of air within said cylinder has been secured. This may be replaced, if desired, by a water-gage which would indicate as well the level of the fluid within the cylinder. It is obvious that for a particular relief-valve a constant pressure is always desired and maintained within the cylinder 22, this constant pressure always being reached when the fluid therein reaches a certain predetermined level.

A pressure-gage 30 is mounted upon said cylinder 22 to indicate the amount of pressure contained within the same. Should any of the fluid contained within said cylinder leak past the piston 19 in the chamber 18, thereby lowering the level of the fluid within said cylinder, an additional supply is secured through the pipe 25 from the conduit 10 to maintain the proper level of fluid, and consequently a proper air-pressure within said cylinder. Owing to the larger area of the piston 19 over the area of the disk 13, said relief-valve may be retained in a closed position with less pressure within the cylinder 22 than that which is being maintained within the conduit 10, and in installing a relief-valve of this kind it will be necessary in each case to figure out just what pressure is required to maintain the relief-valve in a closed position and then provide for a pressure within the cylinder 22 but slightly exceeding this required pressure. By this arrangement the operation of the relief-valve will be very sensitive and operate at the slightest increase of pressure within the conduit 10, as whenever an undue pressure is created in the conduit 10 exceeding the pressure contained within the chamber 18 the relief-valve would be immediately opened, relieving the pressure upon the system and in so doing force the piston 19 downward in its chamber 18 and the fluid back of said piston through the pipe 21 into the cylinder 22, thereby giving a further compression to the air contained within said cylinder. As soon, however, as the abnormal pressure in the conduit has been relieved and the pressure contained therein has been reduced to its normal pressure the compressed air contained within the cylinder 22 will operate upon the fluid contained within said cylinder and force the piston 19 upward to close the relief-valve.

The pipe 25 is for convenience shown in the drawing as entering the conduit 10 near the relief-valve; but it is obvious that in practice the pipe 25 would communicate with the conduit at a point quite remote from the relief-valve.

It will be seen that my improved relief-valve is both simple and sensitive, acting with certainty under a slight increase of pressure and absolutely guarding against the evil accumulative effect of rapid successive diminutions of pressure arising from the action of the valve itself. It is believed that this operation will be thoroughly understood without any further description here.

Having thus described my invention, I claim—

1. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, and a pipe leading from said air-chamber to said conduit.

2. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, and a valve in the pipe connecting the conduit with the air-chamber.

3. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, and a gate in the pipe connecting the air-chamber with the relief-valve.

4. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, a gate in the pipe connecting the air-chamber with the relief-valve, and a valve in the pipe connecting the conduit with the air-chamber.

5. The combination with a conduit, of a relief-valve therein, a piston for operating the relief-valve, a chamber in which the piston is contained, a pipe leading to the chamber, a closed cylinder with which the opposite end of said pipe communicates, means for maintaining within said cylinder a relatively constant pressure, a fluid-supply pipe communicating with said conduit and said cylinder, and means for regulating the amount of fluid passing through said supply-pipe.

6. The combination with a conduit, of a relief-valve therein, a piston for operating the relief-valve, a chamber in which the piston is contained, a pipe leading to the chamber, a closed cylinder with which the opposite end of the pipe communicates, means for maintaining within said cylinder a relatively constant pressure, a pipe from said conduit communicating with said cylinder and supplying fluid thereto, and a valve in said pipe adapted to regulate the amount of fluid passing therethrough.

7. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, and means for withdrawing the fluid from the pipe leading to said piston-chamber.

8. The combination with a conduit, of a relief-valve therein, means for applying fluid-pressure to retain the relief-valve normally closed, a valve controlling the application of pressure, and compressible means removed from and independent of said pressure-controlling valve with which it does not coact but communicating with the device for applying fluid-pressure, said compressible means being adapted to permit the opening of said relief-valve when an undue pressure is attained within said conduit and to close said relief-valve when the undue pressure has been relieved.

9. The combination with a conduit, of a relief-valve therein, a piston for operating the relief-valve, a chamber in which the piston is contained, a pipe leading to the chamber, a relief-reservoir communicating with the opposite end of said pipe, means for maintaining within said relief-reservoir a relatively constant pressure, and a pipe leading from said relief-reservoir to said conduit.

10. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, and a reducing-valve in the pipe connecting the conduit with the air-chamber.

11. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and means for supplying air to said air-chamber.

12. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and an air-supply pipe communicating with said air-chamber.

13. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, an air-supply pipe communicating with said air-chamber, and a valve in said air-supply pipe.

14. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, a valve in the pipe connecting the conduit with the air-chamber, and means for determining the water-level in said air-chamber.

15. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, a valve in the pipe connecting the conduit with the air-chamber, and means for determining the amount of pressure in said air-chamber.

16. The combination with a conduit, of a relief-valve therein, a piston for operating the relief-valve, a chamber in which the piston is contained, a pipe leading to the chamber, an air-chamber communicating with the opposite end of said pipe, means for maintaining within said air-chamber a relatively constant pressure, a pipe leading from said air-chamber to said conduit, a valve in the pipe connecting the conduit with the air-chamber, and a pressure-gage communicating with said air-chamber.

17. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, means for determining the pressure within said air-chamber, an air-supply pipe, and a valve in said air-supply pipe.

18. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and a cock communicating with said air-chamber at the predetermined water-level.

19. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a gate in the pipe connecting the air-chamber with the relief-valve, and a reducing-valve in the pipe connecting the conduit with the air-chamber.

20. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve therein, and means for withdrawing the fluid from the pipe leading to said piston-chamber.

21. The combination with a conduit, of a relief-valve therein, a piston for operating the relief-valve, a chamber in which the piston is contained, a pipe leading to the chamber, a relief-reservoir communicating with the opposite end of said pipe, a pipe leading from said relief-reservoir to said conduit, and a reducing-valve in said pipe.

22. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and means for determining the water-level in said air-chamber.

23. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and means for determining the amount of pressure in said air-chamber.

24. The combination with a conduit, of a relief-valve therein, a piston for operating the relief-valve, a chamber in which the piston is contained, a pipe leading to the chamber, an air-chamber communicating with the opposite end of said pipe, a pipe leading from said air-chamber to said conduit, a reducing-valve in the pipe connecting the conduit with the air-chamber, and a pressure-gage communicating with said air-chamber.

Signed by me at Boston, Massachusetts, this 13th day of June, 1903.

NATHANIEL LOMBARD.

Witnesses:
WALTER E. LOMBARD,
EDNA C. CLEVELAND.